United States Patent
Horng et al.

(10) Patent No.: US 6,957,443 B2
(45) Date of Patent: Oct. 18, 2005

(54) HOLDING DEVICE FOR AN OPTICAL DISK DRIVE

(75) Inventors: Alex Horng, Kaohsiung (TW); Tso-Kuo Yin, Kaohsiung Hsien (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 519 days.

(21) Appl. No.: 10/304,760

(22) Filed: Nov. 27, 2002

(65) Prior Publication Data

US 2004/0205802 A1    Oct. 14, 2004

(51) Int. Cl.⁷ ............................................. G11B 17/28
(52) U.S. Cl. .................................................... 720/707
(58) Field of Search ................................ 720/703, 704, 720/705, 706, 707; 369/270, 271

(56) References Cited

U.S. PATENT DOCUMENTS

| | | | |
|---|---|---|---|
| 6,040,649 A * | 3/2000 | Horng | 310/91 |
| 6,363,048 B1 * | 3/2002 | Wu et al. | 720/707 |
| 6,487,162 B1 * | 11/2002 | Wu et al. | 720/708 |
| 6,525,441 B2 * | 2/2003 | Yamaguchi | 310/90 |
| 6,611,490 B1 * | 8/2003 | Bierhoff | 720/707 |
| 6,868,549 B2 * | 3/2005 | Watanabe et al. | 720/715 |
| 6,871,352 B2 * | 3/2005 | Kurosaka et al. | 720/707 |
| 6,907,611 B2 * | 6/2005 | Konno et al. | 720/604 |
| 2002/0085481 A1 * | 7/2002 | Kim et al. | 369/271 |
| 2002/0089918 A1 * | 7/2002 | Watanabe et al. | 369/270 |
| 2002/0150028 A1 * | 10/2002 | Kurosaka et al. | 369/270 |

* cited by examiner

Primary Examiner—William Korzuch
Assistant Examiner—Mark Blouin
(74) Attorney, Agent, or Firm—Bacon & Thomas PLLC

(57) ABSTRACT

A holding device includes a base, a plurality of holding members, and a plurality of elastic elements. The base includes an annular wall extending in a direction substantially orthogonal to a plane on which the base lies. The annular wall includes a plurality of notches. The holding members are mounted in the annular wall and spaced along an angular direction. Each holding member includes a pressing member extending beyond the annular wall of the base via an associated notch of the annular wall. Each elastic element is mounted between two holding members adjacent to each other. A diameter of a circular ring formed by the holding members changes in response to expansion or compression of the elastic elements, causing the pressing member of each said holding member to move between a holding position outside the annular wall and a release position inside the annular wall.

8 Claims, 4 Drawing Sheets

HOLDING DEVICE FOR AN OPTICAL DISK DRIVE

BACKGROUND OF THE INVENTION

1. Field of the Invention

The present invention relates to a holding device for an optical disk drive for holding an optical disk on a disk tray of the optical disk drive in a balanced manner.

2. Description of the Related Art

FIG. 1 of the drawings illustrates an optical disk drive with a conventional holding device for holding an optical disk. The optical disk drive includes a rotor 90 having a disk tray 91 on a top thereof. The holding device 92 includes a plurality of radially extending pressing members 93. Each pressing member 93 is biased by an elastic element 94 to protrude outward in a radial direction for holding an optical disk (not shown) on the disk tray 91. However, the holding forces of the pressing members 93 may vary one from another due to different elastic forces provided by the elastic elements 94. As a result, holding of the optical disk on the disk tray 91 is not reliable. Further, the procedure of mounting the pressing members 93 is troublesome and time-consuming, as it requires mounting the respective pressing members 93 and the elastic elements 94 one by one.

SUMMARY OF THE INVENTION

It is an object of the present invention to provide an optical disk drive having a disk-holding device that is easy to assemble and manufacture.

Another object of the present invention is to provide an optical disk drive having a disk-holding device for holding an optical disk on a disk tray in a balanced manner.

In accordance with the present invention, a holding device is provided for an optical disk. The holding device includes a base, a plurality of holding members, and a plurality of elastic elements. The base includes an annular wall extending in a direction substantially orthogonal to a plane on which the base lies. The annular wall includes a plurality of notches.

The holding members are mounted in the annular wall and spaced along an angular direction, the holding members together forming a circular ring. Each holding member includes a pressing member extending beyond the annular wall of the base via an associated one of the notches of the annular wall. Each elastic element is mounted between two holding members adjacent to each other.

A diameter of the circular ring formed by the holding members changes in response to expansion or compression of the elastic elements, causing the pressing member of each said holding member to move between a holding position outside the annular wall and a release position inside the annular wall.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENT

A preferred embodiment in accordance with the present invention will now be described with reference to the accompanying drawings.

Figure 1:
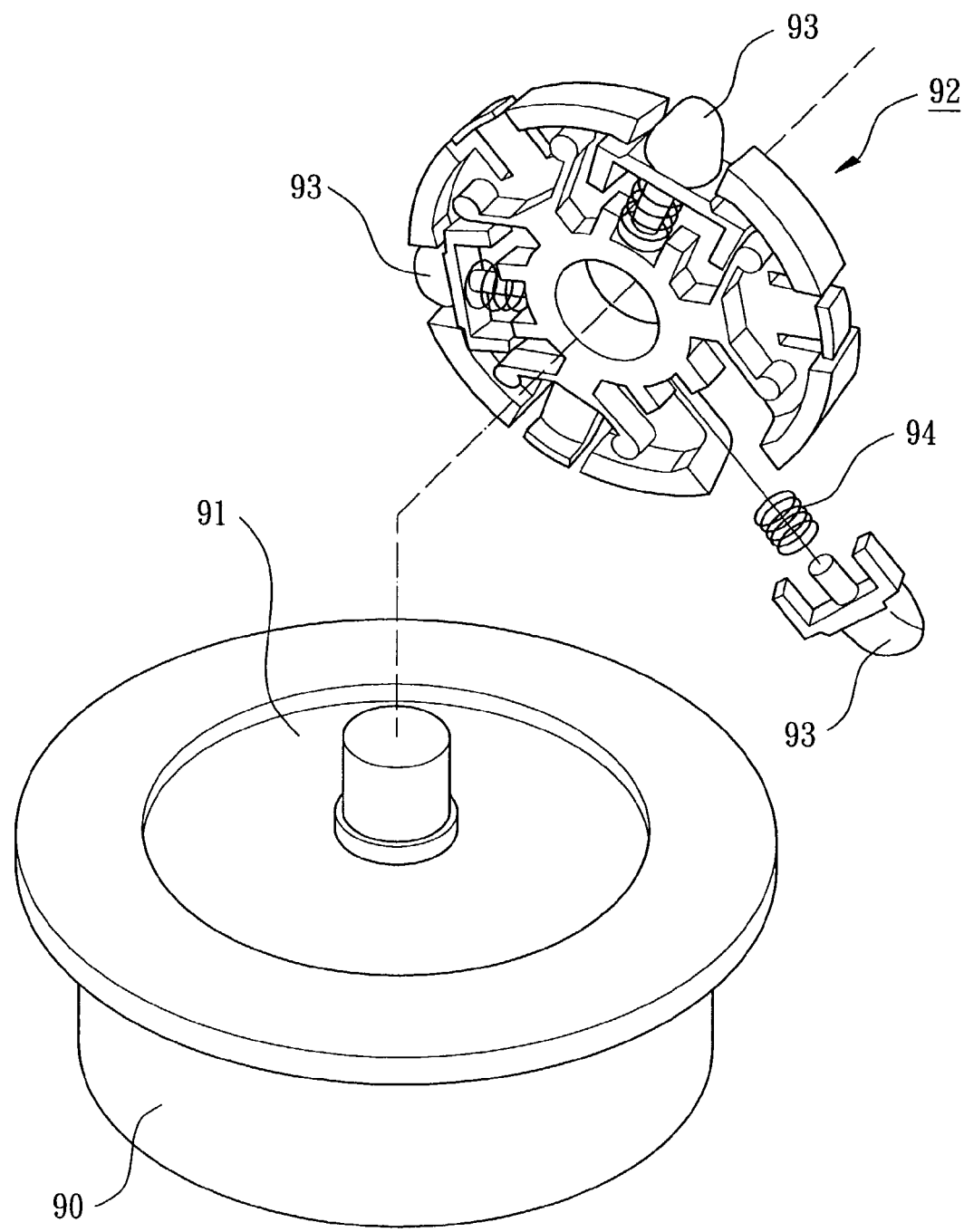
FIG. 1 is an exploded perspective view of an optical disk drive with a conventional holding device.
Figure 2:
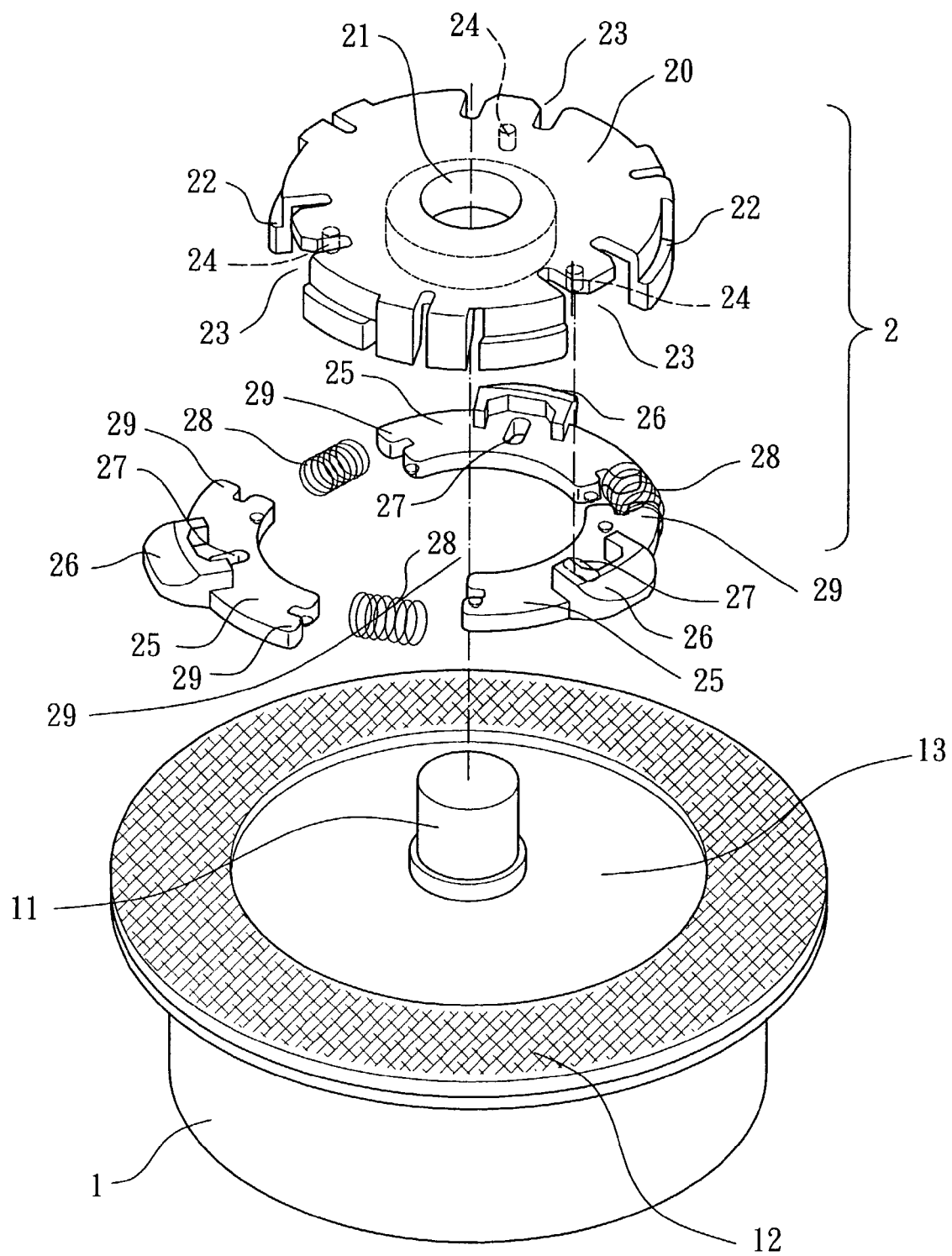
FIG. 2 is an exploded perspective view of an optical disk drive with a holding device in accordance with the present invention.

Referring to FIG. 2, an optical disk drive in accordance with the present invention generally includes a rotor 1 and a holding device 2. The rotor 1 may be of a conventional design. In this embodiment, a shaft 11 is provided on a center of a top side of the rotor 1, and an annular anti-slide plate 12 is mounted on the top side of the rotor 1, providing a disk tray 13 on which an optical disk is mounted.

The holding device 2 includes a base 20 having a central hole 21 so as to be mounted around the shaft 11 of the rotor 1. The base 20 includes an annular wall 22 extends downwardly along a direction substantially orthogonal to a general plane on which the base 20 lies. A plurality of notched sections 23 are defined in the annular wall 22 and spaced at regular angular intervals. Further, the base 20 includes a plurality of guide pegs 24 each of which is aligned with an associated notch 23. Preferably, the guide pegs 24 are formed on an underside of the base 20. The holding device 2 further includes a plurality of holding members 25 each having an arc-shaped main body with two ends. Each end of each holding member 25 has a leg 29. Each holding member 25 has a pressing member 26 projecting outward along a radial direction that is substantially orthogonal to an extending direction of the holding member 25.

In this embodiment, there are three angularly spaced holding members 25 that together form a circular ring when assembled. Each holding member 25 includes a guide slot 27 extending along a radial direction of the base 20. Each peg 24 is received in an associated guide slot 27, allowing limited sliding movement of an associated holding member 25 along the radial direction of the base 20. An elastic element 28 is attached between two adjacent holding members 25, wherein an end of the elastic element 28 is attached to a leg 29 of one of the two adjacent holding members 25, and the other end of the elastic element 28 is attached to a leg 29 of the other one of the two adjacent holding members 25. Thus, the circular ring formed by the holding members 25 has a diameter that will change in response to expansion or compression of the elastic elements 28. Thus, the pressing member 26 on each holding member 25 is movable between a holding position outside the annular wall 22 of the base 20 and a release position inside the annular wall 22 of the base 20.

Figure 3:
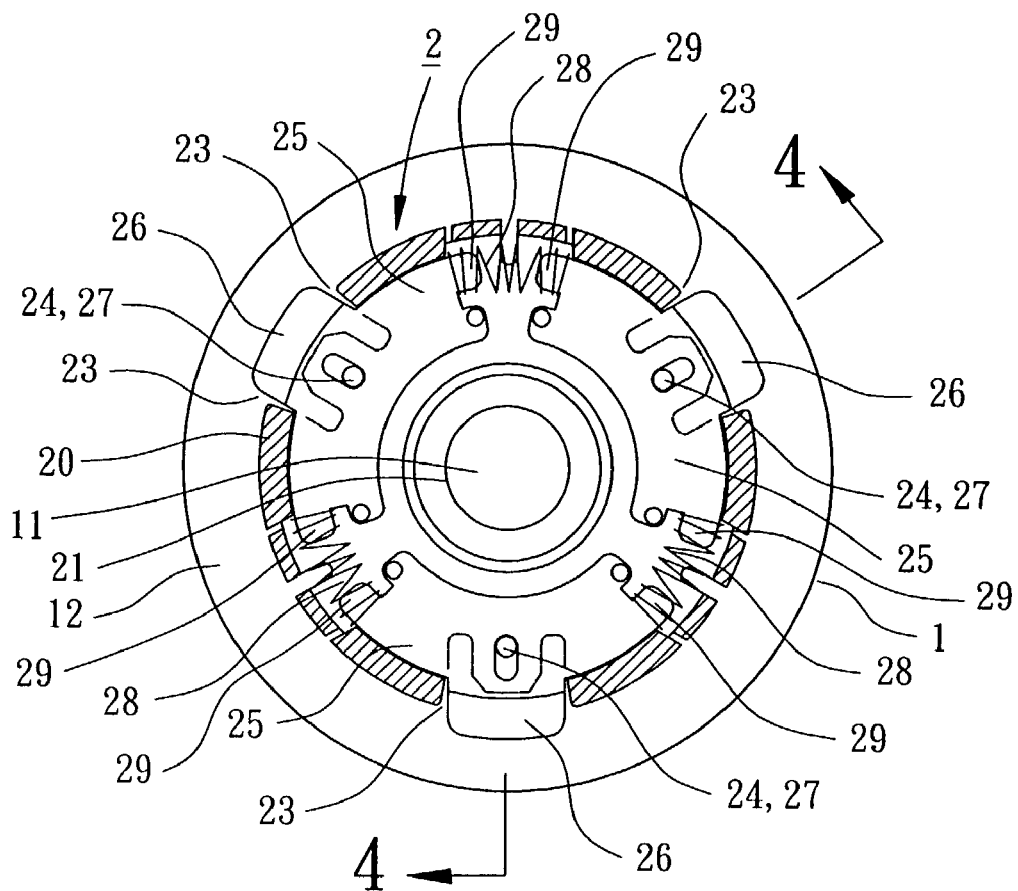
FIG. 3 is a sectional view of the optical disk drive in FIG. 2.
Figure 4:
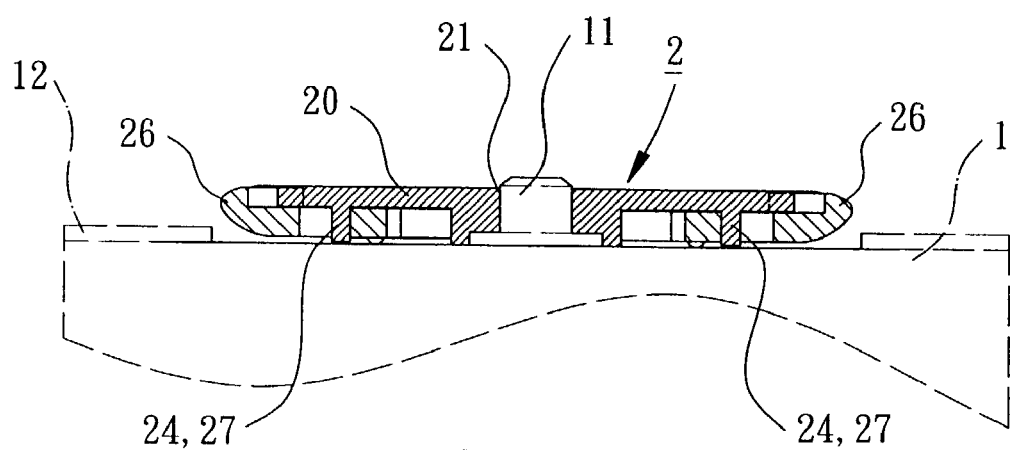
FIG. 4 is a sectional view taken along plane 4—4 in FIG. 3.

In assembly, as illustrated in FIGS. 3 and 4, the holding members 25 are mounted in the annular wall 22 of the base 20. The pressing member 26 on each holding member 25 protrudes beyond the annular wall 22 of the base 20 via an associated notch 23. As mentioned above, an elastic element 28 is attached between two adjacent holding members 25, wherein an end of the elastic element 28 is attached to a leg 29 of one of the two adjacent holding members 25, and the other end of the elastic element 28 is attached to a leg 29 of the other one of the two adjacent holding members 25. Thus, the circular ring formed by the holding members 25 has a diameter that will change in response to expansion or compression of the elastic elements 28. Thus, the pressing member 26 on each holding member 25 is movable between a holding position outside the annular wall 22 of the base 20 and a release position inside the annular wall 22 of the base 20. The elastic force of the respective elastic element 28 is uniformly distributed to the two adjacent holding members 25 between which the respective elastic element 28 is mounted. The guide pegs 24 on the base 20 and the guide slot 27 on each holding member 25 restrain movement of the holding members 25 in the radial direction. Particularly, the maximum travel of the pressing member 26 of each holding member 25 shall not be longer than a length of the guide slot 27.

Figure 5:
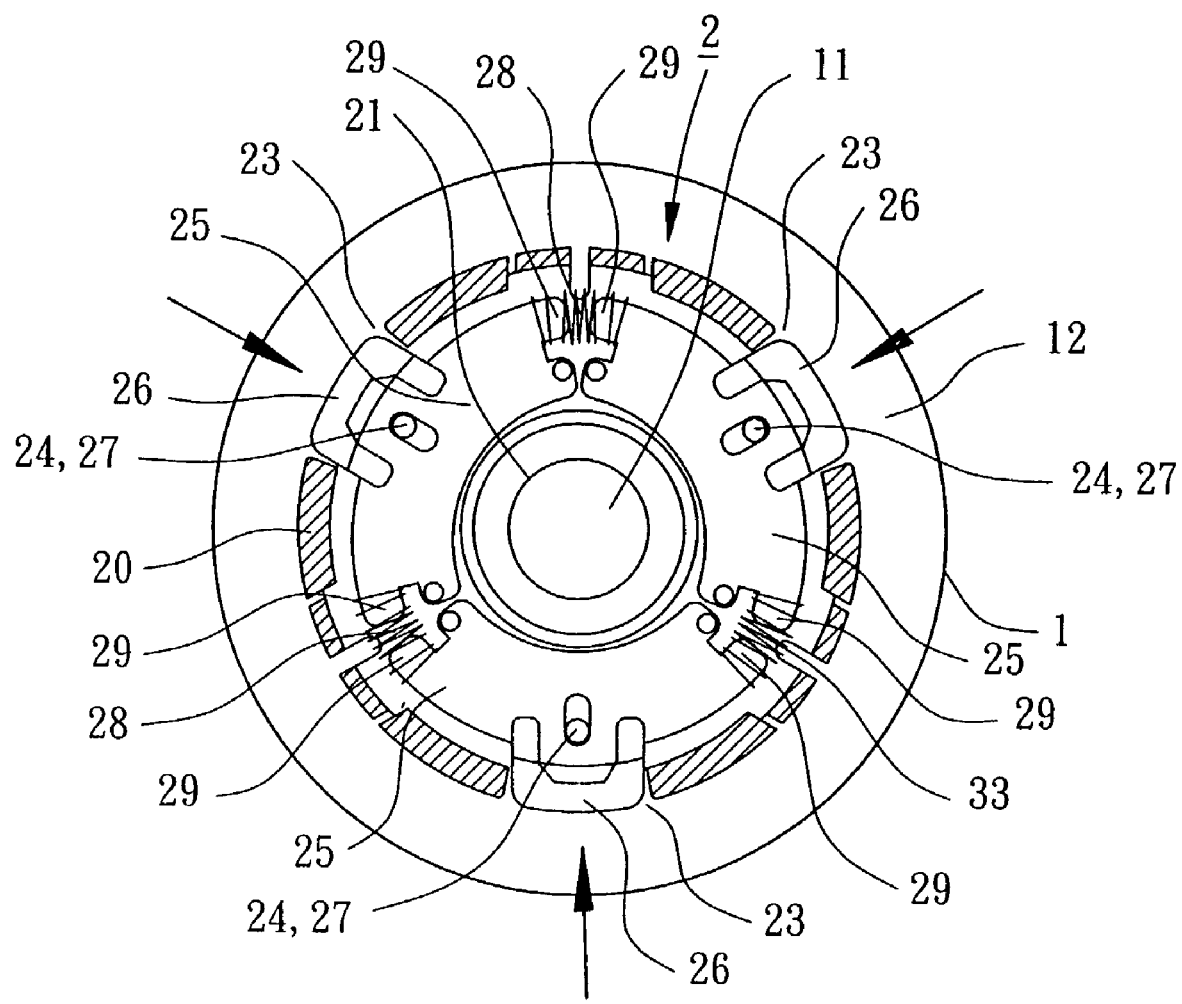
FIG. 5 is a sectional view similar to FIG. 3, illustrating operation of the holding device in accordance with the present invention.

Referring to FIG. 5, in use, an optical disk (not shown) is placed on the disk tray 13, with the shaft 11 of the rotor 1 extending through a central hole (not shown) of the optical disk. When the central hole of the optical disk is passing through the base 20, a peripheral edge defining the central hole of the optical disk presses against the pressing member 26 of each holding member 25, causing the pressing member 26 of each holding member 25 to retract into the annular wall 22 of the base 20. Namely, the pressing member 26 of each holding member 25 is moved to the release position. Thus, the optical disk is allowed to pass through the base 20 and located on the disk tray 13. Thus, the pressing member 26 of each holding member 25 moves radially outward under the action of the elastic elements 28 to the holding position outside the annular wall 22. Thus, the pressing members 26 of the holding members 25 press against the peripheral edge defining the central hole of the optical disk. As a result, the optical disk is securely and reliably held in place in a balanced manner.

Since the elastic elements 28 and the holding members 25 are spaced at regular angular intervals, the forces acting on the holding members 25 are uniform and balanced even after a long-term-use and even if one of the elastic elements fatigues. Further, in the assembling procedure for the holding device in accordance with the present invention, the holding members 25 and the elastic elements 28 can be assembled in advance in a circular device, and a clamping device is then used to mount the holding members 25 into the annular wall 22 of the base 20. Thus, the holding members 25 and the elastic elements 28 can be easily assembled.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A holding device for an optical disk drive, the holding device comprising:

a base lying on a plane, the base including an annular wall extending in a direction substantially orthogonal to the plane on which the base lies, the annular wall including a plurality of notches;

a plurality of holding members mounted in the annular wall and spaced along an angular direction, the holding members together forming a circular ring, each said holding member including a pressing member extending beyond the annular wall of the base via an associated one of the notches of the annular wall; and a plurality of elastic elements, each said elastic element being mounted between two of said holding members adjacent to each other;

wherein a diameter of the circular ring formed by the holding members changes in response to expansion or compression of the elastic elements, causing the pressing member of each said holding member to move between a holding position outside the annular wall and a release position inside the annular wall.

2. The holding device for an optical disk drive as claimed in claim 1, wherein each said holding member includes two ends each having a leg for attachment of one of two ends of an associated one of the elastic elements.

3. The holding device for an optical disk drive as claimed in claim 1, wherein the base includes a plurality of guide pegs inside the annular wall, each said holding member including a guide slot for slidingly receiving an associated one of the guide pegs, the guide slot extending in a radial direction of the base.

4. The holding device for an optical disk drive as claimed in claim 1, wherein the base includes a central hole adapted to be engaged with a shaft of a rotor of the optical disk drive.

5. The holding device for an optical disk drive as claimed in claim 1, wherein the notches are spaced at regular angular intervals.

6. The holding device for an optical disk drive as claimed in claim 1, wherein the number of the holding members is three.

7. The holding device for an optical disk drive as claimed in claim 3, wherein each said guide peg is aligned with an associated one of the notches.

8. A holding device for an optical disk drive, the holding device comprising:

a base including a plurality of annularly spaced notches;

a plurality of holding members mounted in the base and spaced along an angular direction, each said holding member including a pressing member extending outward along a radial direction of the base and passable through an associated one of the notches of the base; and a plurality of elastic elements, each said elastic elements being mounted between two of said holding members adjacent to each other;

wherein a diameter of a circular ring formed by the holding members changes in response to expansion or compression of the elastic elements, causing the pressing member of each said holding member to move between a holding position outside the base and a release position inside the base.

* * * * *